US008239095B2

United States Patent
Kikuchi et al.

(10) Patent No.: US 8,239,095 B2
(45) Date of Patent: Aug. 7, 2012

(54) COOLING SYSTEM, MOTOR VEHICLE EQUIPPED WITH COOLING SYSTEM, AND CONTROL METHOD OF COOLING SYSTEM

(75) Inventors: Yoshiaki Kikuchi, Toyota (JP); Tetsuya Ishihara, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 632 days.

(21) Appl. No.: 12/294,487

(22) PCT Filed: Mar. 27, 2007

(86) PCT No.: PCT/JP2007/056404
§ 371 (c)(1),
(2), (4) Date: Sep. 25, 2008

(87) PCT Pub. No.: WO2007/116739
PCT Pub. Date: Oct. 18, 2007

(65) Prior Publication Data
US 2010/0241308 A1    Sep. 23, 2010

(30) Foreign Application Priority Data

Mar. 28, 2006  (JP) ................................ 2006-088407

(51) Int. Cl.
*G05B 13/02* (2006.01)
*G05B 15/02* (2006.01)
*G05D 23/19* (2006.01)
*B60K 11/06* (2006.01)
*B60K 11/08* (2006.01)

(52) U.S. Cl. .......... 701/36; 700/276; 180/68.1; 429/439

(58) Field of Classification Search .................... 701/36; 62/426, 61, 186, 133, 179, 239, 243, 244; 180/68.1; 244/1 N; 429/433, 434, 436, 439, 429/442, 512; 700/276, 280, 281, 278, 282, 700/299, 300, 304
See application file for complete search history.

(56) References Cited

U.S. PATENT DOCUMENTS 5,490,572 A    2/1996  Tajiri et al.
(Continued)

FOREIGN PATENT DOCUMENTS

EP    1 504 949 A1    2/2005
(Continued)

*Primary Examiner* — Paul N Dickson
*Assistant Examiner* — Karen A Beck
(74) *Attorney, Agent, or Firm* — Kenyon & Kenyon LLP

(57) ABSTRACT

A cooling system of the invention mounted on a motor vehicle has a damper configured to switch over an air blow mode between an inside air intake mode of taking in the air from a passenger compartment of the motor vehicle via operation of a battery blower fan and directly blowing the intake air to a battery and an A/C intake mode of taking in the air cooled down by an air conditioner (evaporator) via operation of the battery blower fan and blowing the cooled intake air to the battery. In response to a switchover demand of the air blow mode, when a vehicle speed is not lower than a preset reference speed, a switchover of the damper is immediately performed to switch over the air blow mode. When the vehicle speed is lower than the preset reference speed, the switchover of the damper is prohibited to keep the air blow mode unchanged. At the higher vehicle speed, the drive-related noise (background noise) sufficiently masks the wind noise occurring in the course of the switchover of the damper. The damper is thus switched over only at the vehicle speed of not lower than the preset reference speed. This arrangement effectively prevents the driver and the other passengers from feeling odd and uncomfortable.

13 Claims, 9 Drawing Sheets

U.S. PATENT DOCUMENTS

| | | | |
|---|---|---|---|
| 6,675,597 B2* | 1/2004 | Ieda et al. | 62/244 |
| 6,691,523 B1* | 2/2004 | Sangwan et al. | 62/133 |
| 7,024,871 B2* | 4/2006 | Zhu et al. | 62/133 |
| 7,348,741 B2* | 3/2008 | Minekawa et al. | 318/268 |
| 7,360,370 B2* | 4/2008 | Shah et al. | 62/131 |
| 2002/0140389 A1* | 10/2002 | Ohki et al. | 318/471 |
| 2003/0118891 A1* | 6/2003 | Saito et al. | 429/62 |
| 2003/0209022 A1* | 11/2003 | Ieda et al. | 62/244 |
| 2003/0233839 A1* | 12/2003 | Hirose et al. | 62/186 |
| 2006/0080986 A1* | 4/2006 | Inoue | 62/259.2 |
| 2006/0186213 A1* | 8/2006 | Carey et al. | 236/1 B |
| 2007/0027580 A1* | 2/2007 | Ligtenberg et al. | 700/300 |
| 2007/0033953 A1* | 2/2007 | Gao | 62/133 |
| 2007/0089442 A1* | 4/2007 | Tsuchiya | 62/186 |
| 2007/0144190 A1* | 6/2007 | Temmyo et al. | 62/180 |
| 2007/0178346 A1* | 8/2007 | Kiya et al. | 429/24 |
| 2009/0133859 A1* | 5/2009 | Suzuki et al. | 165/121 |
| 2009/0248204 A1* | 10/2009 | Kikuchi et al. | 700/275 |
| 2010/0241308 A1* | 9/2010 | Kikuchi et al. | 701/36 |

FOREIGN PATENT DOCUMENTS

| | | |
|---|---|---|
| JP | 09-086137 A | 3/1997 |
| JP | 2004-1674 A | 1/2004 |
| JP | 2004-255960 A | 9/2004 |
| JP | 2005-093434 A | 4/2005 |
| JP | 2005-178406 A | 7/2005 |
| JP | 2005-254974 A | 9/2005 |
| JP | 2005-306197 A | 11/2005 |
| JP | 2005-343377 | 12/2005 |
| JP | 2006-143183 A | 6/2006 |
| WO | WO 2005/092650 A1 | 10/2005 |

* cited by examiner

COOLING SYSTEM, MOTOR VEHICLE EQUIPPED WITH COOLING SYSTEM, AND CONTROL METHOD OF COOLING SYSTEM

This is a 371 national phase application of PCT/JP2007/056404 filed 27 Mar. 2007, claiming priority to Japanese Patent Application No. JP 2006-088407 filed 28 Mar. 2006, the contents of which are incorporated herein by reference.

TECHNICAL FIELD

The present invention relates to a cooling system configured to cool down an accumulator mounted on a motor vehicle, as well as a motor vehicle equipped with such a cooling system and a control method of such a cooling system.

BACKGROUND ART

One proposed structure of a cooling system mounted on a motor vehicle switches over the position of a damper to change over the air blow pathway between an air flow path of taking in the air inside or outside of a passenger compartment of the motor vehicle and blowing the intake air to a battery and an air flow path of taking in the air cooled down by an evaporator and blowing the cooled intake air to the battery and cool down the battery (see, for example, Patent Documents 1 and 2). This prior art cooling system switches over the position of the damper based on the temperature of the battery, in order to keep the battery in an adequate temperature range.

Patent Document 1: Japanese Patent Laid-Open No. 2005-93434

Patent Document 2: Japanese Patent Laid-Open No. 2005-254974

DISCLOSURE OF THE INVENTION

In the cooling system of this prior art structure, unusual noise occurs with operation of the damper and a blower fan of blowing the air to the battery to cool down the battery. The driver and the other passengers are generally not informed of the operation of cooling down the battery. The occurrence of unusual noise in the course of cooling down the battery thus makes the driver and the other passengers feel odd and uncomfortable.

In the cooling system, the motor vehicle equipped with the cooling system, and the control method of the cooling system, there would thus be a demand for preventing the driver and the other passengers from feeling odd and uncomfortable by the occurrence of wind noise or unusual noise in the course of cooling down a battery or an accumulator.

The present invention accomplishes at least part of the demand mentioned above and the other relevant demands by the following configurations applied to the cooling system, the motor vehicle equipped with the cooling system, and the control method of the cooling system.

According to one aspect, the invention is directed to a cooling system constructed to cool down an accumulator mounted on a motor vehicle and includes: an air blower configured to have multiple air blow modes of taking in the air from different locations and blowing the intake air to the accumulator; an air blow mode switchover module configured to change over connection and disconnection of multiple air flow paths in the multiple air blow modes and thereby switch over a current air blow mode between the multiple air blow modes; a noise level detection-estimation module configured to detect or estimate a noise level in a passenger compartment of the motor vehicle; and a controller configured to, in response to a switchover demand of the current air blow mode in a state of blowing the intake air to the accumulator via the air blow mode switchover module, control the air blower and the air blow mode switchover module to switch over the current air blow mode based on the detected or estimated noise level.

In the cooling system according to this aspect of the invention, the air blow mode switchover module is constructed to change over connection and disconnection of the respective air flow paths in the multiple air blow modes of taking in the air from different locations and blowing the intake air to the accumulator and thereby switch over the current air blow mode between the multiple air blow modes. In response to the switchover demand of the current air blow mode in the state of blowing the intake air to the accumulator via the air blow mode switchover module, the air blower and the air blow mode switchover module are controlled to switch over the current air blow mode based on the noise level in the passenger compartment of the motor vehicle. Some level of the noise in the passenger compartment sufficiently masks the unusual noise like wind noise occurring in the course of the operation of the air blow mode switchover module. The switchover of the air blow mode according to the noise level in the passenger compartment thus effectively prevents the driver and the other passengers from feeling odd and uncomfortable.

In one preferable application of the cooling system according to the above aspect of the invention, when the detected or estimated noise level is not lower than a preset reference level, the controller controls the air blower and the air blow mode switchover module to switch over the current air blow mode in order to satisfy the switchover demand. When the detected or estimated noise level is lower than the preset reference level, the controller controls the air blower and the air blow mode switchover module to keep the current air blow mode unchanged, irrespective of the switchover demand. In response to the switchover demand of the current air blow mode, the air blow mode is actually switched over after the noise level in the passenger compartment reaches or exceeds the preset reference level. This arrangement effectively prevents the driver and the other passengers from feeling odd and uncomfortable due to the wind noise or unusual noise occurring in the course of the operation of the air blow mode switchover module, while cooling down the accumulator.

In one preferable embodiment of the invention, the cooling system further has an air conditioner configured to condition the air in the passenger compartment. The multiple air blow modes include a first air blow mode of taking in the air inside the passenger compartment or outside the passenger compartment and directly blowing the intake air to the accumulator and a second air blow mode of taking in the air cooled down by the air conditioner and blowing the cooled intake air to the accumulator.

In one preferable application of the cooling system of the embodiment having the first air blow mode and the second air blow mode, in response to a switchover demand requiring a switchover from the first air blow mode to the second air blow mode, when the detected or estimated noise level is not lower than a preset reference level, the controller controls the air blower and the air blow mode switchover module to switch over the first air blow mode to the second air blow mode, and when the detected or estimated noise level is lower than the preset reference level, the controller controls the air blower and the air blow mode switchover module to keep the first air blow mode unchanged and increase an air volume blown to the accumulator. This arrangement effectively compensates for insufficient cooling of the accumulator caused by the first air blow mode kept unchanged.

In another preferable application of the cooling system of the embodiment having the first air blow mode and the second air blow mode, in response to a switchover demand requiring a switchover from the second air blow mode to the first air blow mode, when the detected or estimated noise level is not lower than a preset reference level, the controller controls the air blower and the air blow mode switchover module to switch over the second air blow mode to the first air blow mode. When the detected or estimated noise level is lower than the preset reference level, on the other hand, the controller controls the air blower and the air blow mode switchover module to keep the second air blow mode unchanged and decrease an air volume blown to the accumulator. This arrangement effectively reduces unnecessary energy consumption for cooling the accumulator caused by the second air flow mode kept unchanged.

In still another preferable application of the cooling system of the embodiment having the first air blow mode and the second air blow mode, the second air blow mode activates the air conditioner with a total air volume as a sum of an air volume required to condition the air in the passenger compartment and an air volume required to be blown to the accumulator, takes in the air cooled down by the air conditioner at the air volume required to be blown to the accumulator, and blows the cooled intake air to the accumulator. This arrangement effectively reduces the influence on the air conditioning in the passenger compartment in the second air blow mode.

In the cooling system of the invention, it is preferable that, in response to the switchover demand, the controller controls the air blower and the air blow mode switchover module to switch over the current air blow mode by additionally taking into account an air volume blown to the accumulator. The noise level occurring in the course of the operation of the air blow mode switchover module is estimable from the air volume blown to the accumulator. The switchover of the air blow mode according to the air volume blown to the accumulator thus more effectively prevents the driver and the other passengers from feeling odd and uncomfortable.

In one preferable application of the cooling system according to the above aspect of the invention, the noise level detection-estimation module has a vehicle speed detector configured to detect a vehicle speed of the motor vehicle, and the noise level detection-estimation module detects or estimates the noise level in the passenger compartment, based on the detected vehicle speed.

In one preferable application of the cooling system mounted on a motor vehicle equipped with an internal combustion engine, the noise level detection-estimation module has an engine rotation speed detector configured to detect a rotation speed of the internal combustion engine, and the noise level detection-estimation module detects or estimates the noise level in the passenger compartment, based on the detected rotation speed of the internal combustion engine.

In one preferable application of the cooling system mounted on a motor vehicle equipped with an audio output module configured to output sound with an adjustable volume in the passenger compartment, the noise level detection-estimation module detects or estimates the noise level in the passenger compartment, based on a volume adjustment condition of the audio output module.

In another preferable embodiment of the invention, the cooling system further has a temperature-relevant parameter detector configured to detect a temperature-relevant parameter reflecting a temperature of the accumulator. The switchover demand of the current air blow mode is given, based on the detected temperature-relevant parameter. This arrangement enables the second air blow mode to be selected according to the requirement.

In another preferable application of the cooling system according to the invention, the accumulator is designed to transmit electric power to and from a driving motor mounted on the motor vehicle.

According to another aspect, the invention is also directed to a motor vehicle equipped with the cooling system having any of the above arrangements. The cooling system is basically constructed to cool down an accumulator mounted on the motor vehicle and includes: an air blower configured to have multiple air blow modes of taking in the air from different locations and blowing the intake air to the accumulator; an air blow mode switchover module configured to change over connection and disconnection of multiple air flow paths in the multiple air blow modes and thereby switch over a current air blow mode between the multiple air blow modes; a noise level detection-estimation module configured to detect or estimate a noise level in a passenger compartment of the motor vehicle; and a controller configured to, in response to a switchover demand of the current air blow mode in a state of blowing the intake air to the accumulator via the air blow mode switchover module, control the air blower and the air blow mode switchover module to switch over the current air blow mode based on the detected or estimated noise level.

The motor vehicle according to this aspect of the invention is equipped with the cooling system of the invention having any of the arrangements described above. The motor vehicle accordingly has the effects similar to those of the cooling system discussed above and effectively prevents the driver and the other passengers from feeling odd and uncomfortable due to the occurrence of unusual noise in the course of cooling down the accumulator, such as a battery.

According to still another aspect, the invention is further directed to a control method of a cooling system, which includes: an air conditioner configured to condition the air in a passenger compartment of a motor vehicle; an air blower configured to have multiple air blow modes of taking in the air from different locations and blowing the intake air to an accumulator mounted on the motor vehicle; and an air blow mode switchover module configured to change over connection and disconnection of multiple air flow paths in the multiple air blow modes and thereby switch over a current air blow mode between the multiple air blow modes. In response to a switchover demand of the current air blow mode in a state of blowing the intake air to the accumulator via the air blow mode switchover module, the control method controls the air blow mode switchover module to switch over the current air blow mode based on a noise level in the passenger compartment.

In the control method of the cooling system according to this aspect of the invention, the air blow mode switchover module is constructed to change over connection and disconnection of the respective air flow paths in the multiple air blow modes of taking in the air from different locations and blowing the intake air to the accumulator and thereby switch over the current air blow mode between the multiple air blow modes. In response to the switchover demand of the current air blow mode in the state of blowing the intake air to the accumulator via the air blow mode switchover module, the air blower and the air blow mode switchover module are controlled to switch over the current air blow mode based on the noise level in the passenger compartment of the motor vehicle. Some level of the noise in the passenger compartment sufficiently masks the unusual noise like wind noise occurring in the course of the operation of the air blow mode switchover module. The switchover of the air blow mode according to the noise level in the passenger compartment thus effectively prevents the driver and the other passengers from feeling odd and uncomfortable.

BEST MODES OF CARRYING OUT THE INVENTION

One mode of carrying out the invention is described below as a preferred embodiment with reference to the accompanied drawings.

Figure 1:
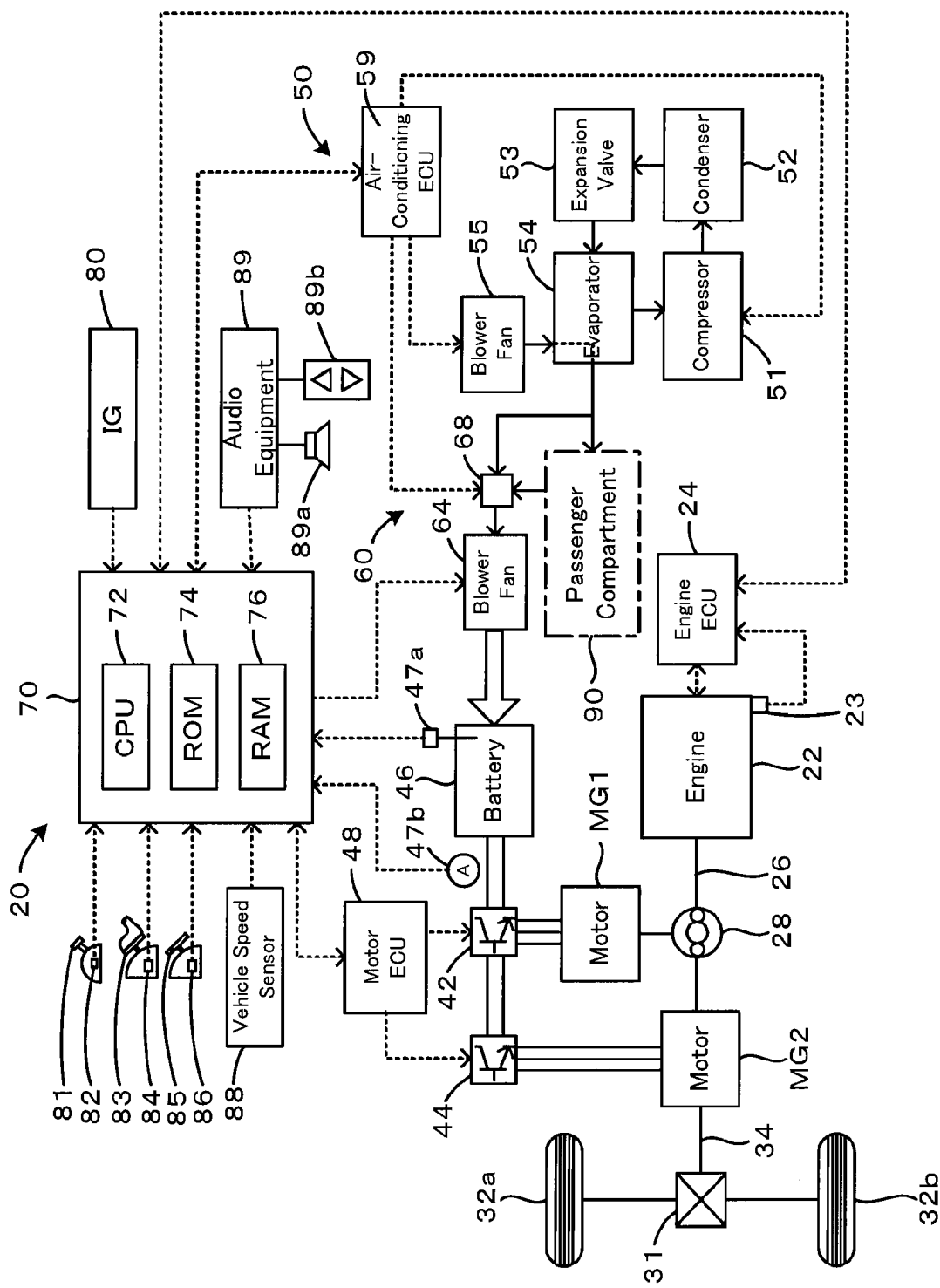
FIG. 1 schematically illustrates the configuration of a hybrid vehicle 20 in one embodiment of the invention.
Figure 2:
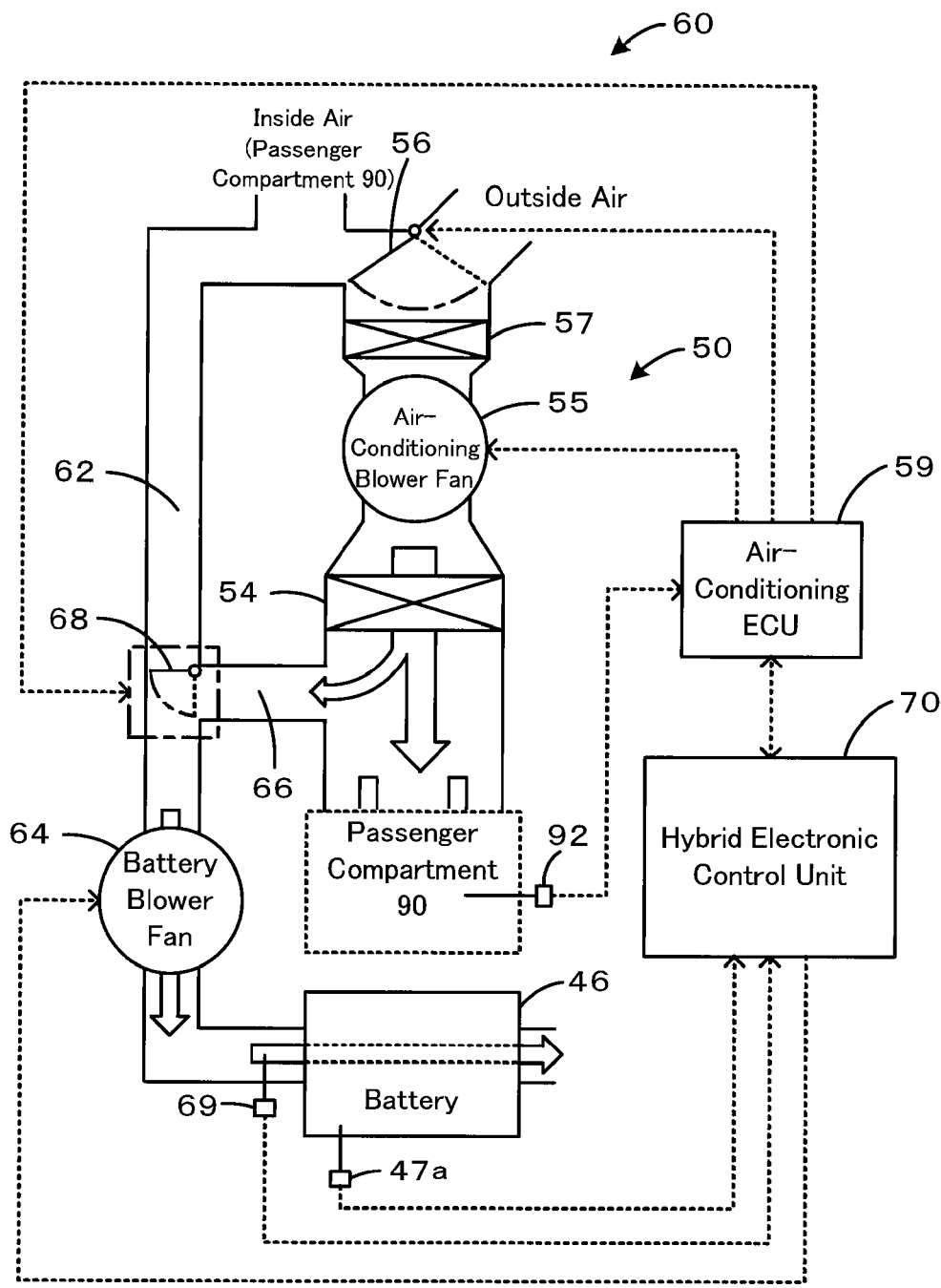
FIG. 2 shows the schematic structure of a cooling system 60 for a battery 46 in the embodiment.

FIG. 1 schematically illustrates the configuration of a hybrid vehicle 20 in one embodiment of the invention. FIG. 2 shows the schematic structure of a cooling system 60 for a battery 46 in the embodiment. As illustrated in FIG. 1, the hybrid vehicle 20 of the embodiment has an engine 22, a planetary gear mechanism 28 having a carrier connected to a crankshaft 26 of the engine 22 and a ring gear connected to a driveshaft 34 that is linked with drive wheels 32a and 32b via a differential gear 31, a motor MG1 connected with a sun gear of the planetary gear mechanism 28 and designed to have power generation capability, a motor MG2 designed to input and output power from and to a driveshaft 34, the battery 46 arranged to transmit electric power to and from the motors MG1 and MG2 via inverters 42 and 44, an air conditioner 50 configured to condition the air in a passenger compartment 90, the cooling system 60 configured to use the air cooled down by the air conditioner 50 and thereby cool down the battery 46, audio equipment 89 incorporated in a console panel in front of the driver's seat in the passenger compartment 90 and having a tuner (not shown), a speaker 89a for audio output, and a volume control button 89b, and a hybrid electronic control unit 70 configured to control the driving system of the vehicle and the cooling system 60 of the embodiment.

The engine 22 is under operation control of an engine electronic control unit (hereafter referred to as engine ECU) 24. The operation control includes, for example, fuel injection control, ignition control, and intake air flow regulation. The engine ECU 24 inputs signals from various sensors designed to measure and detect the operating conditions of the engine 22, for example, a crank position from a crank position sensor 23 attached to the crankshaft 26 of the engine 22. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

Both the motors MG1 and MG2 are driven and controlled by a motor electronic control unit (hereafter referred to as motor ECU) 48. The motor ECU 48 inputs various signals required for driving and controlling the motors MG1 and MG2, for example, signals representing rotational positions of rotors in the motors MG1 and MG2 from rotational position detection sensors (not shown) and signals representing phase currents to be applied to the motors MG1 and MG2 from current sensors (not shown). The motor ECU 48 outputs switching control signals to the inverters 42 and 44. The motor ECU 48 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

As shown in FIGS. 1 and 2, the air conditioner 50 has a compressor 51 configured to compress a coolant to high-temperature, high-pressure gas, a condenser 52 configured to cool down the compressed coolant with the outside air to high-pressure liquid, an expansion valve 53 configured to abruptly expand the cooled coolant to low-temperature, low-pressure mist, an evaporator 54 configured to evaporate the coolant to low-temperature, low-pressure gas by heat exchange between the low-temperature, low-pressure coolant and the air, and an air-conditioning blower fan 55 configured to blow the air cooled down by the heat exchange of the evaporator 54 to the passenger compartment 90. The air-conditioning blower fan 55 is driven to take in the air from an inside air-outside air switchover damper 56 via a filter 57 and to cool down the intake air by the evaporator 54 and blow the cooled intake air to the passenger compartment 90.

The air conditioner 50 is under control of an air-conditioning electronic control unit (hereafter referred to as air-conditioning ECU) 59. The air-conditioning ECU 59 inputs an inside temperature Tin or temperature in the passenger compartment 90 from a temperature sensor 92. The air-conditioning ECU 59 outputs driving signals to the compressor 51, to the air-conditioning blower fan 55, to the inside air-outside air switchover damper 56, and to a mode switchover damper 68 (explained below). The air-conditioning ECU 59 establishes communication with the hybrid electronic control unit 70 to drive and control air conditioner 50 in response to control signals received from the hybrid electronic control unit 70 and to output data regarding the operating conditions of the air conditioner 50 to the hybrid electronic control unit 70 according to the requirements.

The cooling system 60 is arranged to take in the air from the passenger compartment 90 and directly blow the intake air to the battery 46, so as to cool down the battery 46 (hereafter this cooling mode is referred to as inside air intake mode). The cooling system 60 is also arranged to alternately take in the air cooled down by the evaporator 54 of the air conditioner 50 and blow the cooled intake air to the battery 46, so as to cool down the battery 46 (hereafter this cooling mode is referred to as A/C intake mode). As shown in FIG. 2, the cooling system 60 has an air conduit 62 arranged to connect the passenger compartment 90 (inside air) with the battery 46, a battery blower fan 64 provided on the air conduit 62 to blow the intake air to the battery 46, a branch pipe 66 arranged to blow part of the air flowed from the air-conditioning blower fan 55 through the evaporator 54 to the upstream of the battery blower fan 64 in the air conduit 62, and the mode switchover damper 68 provided at a joint of the air conduit 62 and the branch pipe 66 to selectively block the inside air or block the branch pipe 66.

The hybrid electronic control unit 70 is constructed as a microcomputer including a CPU 72, a ROM 74 configured to store processing programs, a RAM 76 configured to temporarily store data, input and output ports (not shown), and a communication port (not shown). The hybrid electronic control unit 70 inputs, via its input port, a battery temperature Tb or temperature of the battery 46 from a temperature sensor 47a, a charge-discharge electric current Ib from a current sensor 47b attached to an output terminal of the battery 46, an intake air temperature Tbi from a temperature sensor 69 provided in the vicinity of an entrance to the battery 46 in the air conduit 62, an ignition signal from an ignition switch 80, a gearshift position SP or a current setting position of a gearshift lever 81 from a gearshift position sensor 82, an accelerator opening Acc or the driver's depression amount of the accelerator pedal 83 from an accelerator pedal position sensor 84, a brake pedal position BP or the driver's depression amount of the brake pedal 85 from a brake pedal position sensor 86, a vehicle speed V from a vehicle speed sensor 88, and an operation signal from the volume control button 89b. The hybrid electronic control unit 70 outputs driving signals to the battery blower fan 64 and to the other relevant elements via its output port. The hybrid electronic control unit 70 makes connection with the engine ECU 24, the motor ECU 48, and the air-conditioning ECU 59 via its communication port to transmit various control signals and data to and from the engine ECU 24, the motor ECU 48, and the air-conditioning ECU 59 as mentioned previously.

Figure 3:
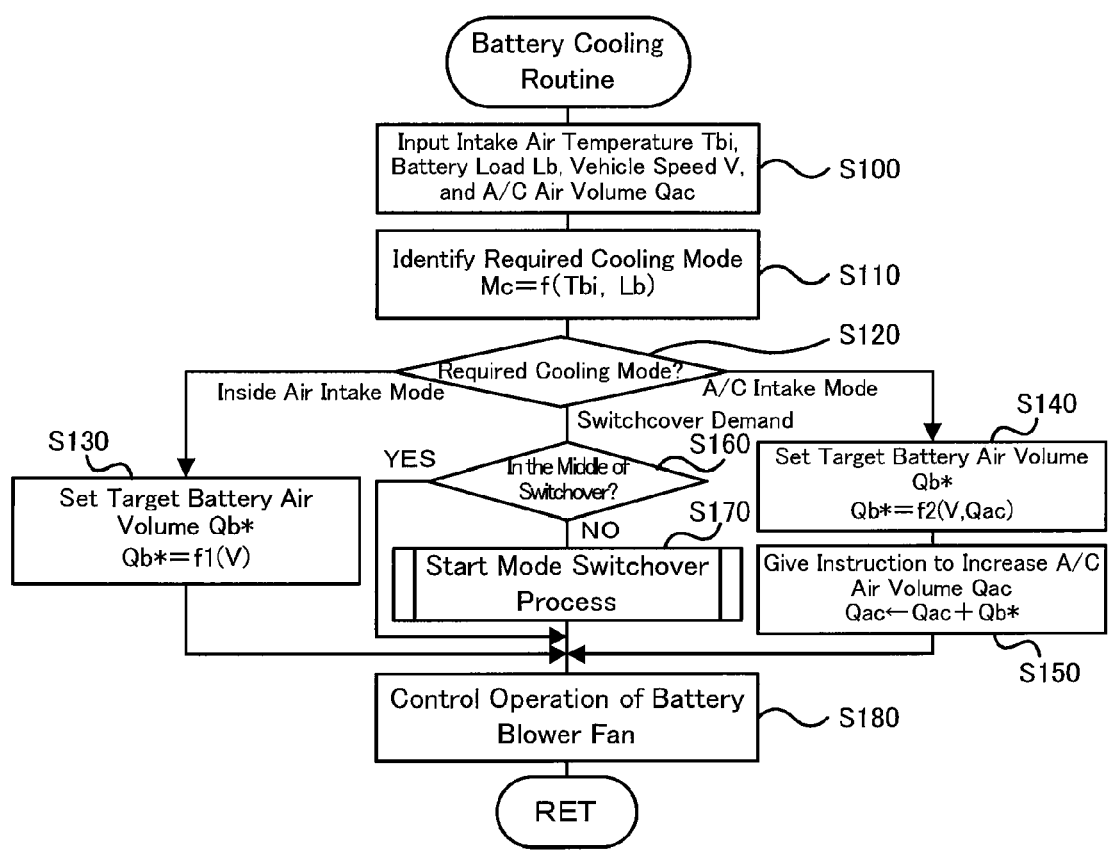
FIG. 3 is a flowchart showing a battery cooling routine executed by a hybrid electronic control unit 70 in the embodiment.

The following describes the operations of the hybrid vehicle 20 of the embodiment having the configuration discussed above, especially a series of operations to cool down the battery 46. FIG. 3 is a flowchart showing a battery cooling routine executed by the hybrid electronic control unit 70. This routine is repeatedly performed at preset time intervals (for example, at every several ten msec) when the battery temperature Tb measured by the temperature sensor 47a is not lower than a preset reference temperature (for example, 50° C.).

In the battery cooling routine, the CPU 72 of the hybrid electronic control unit 70 first inputs various data required for control, for example, the intake air temperature Tbi from the temperature sensor 69, a battery load Lb of the battery 46, the vehicle speed V from the vehicle speed sensor 88, and an A/C air volume Qac of the air conditioner 50 (step S100). The battery load Lb of the battery 46 may be obtained by averaging a preset number of computed values of charge-discharge electric power of the battery 46 (the product of the square of the charge-discharge electric current Ib measured by the current sensor 47b and an internal resistance of the battery 46). The A/C air volume Qac of the air conditioner 50 is set based on the user's set air volume as the air flow to be blown out to the passenger compartment 90, the user's set temperature, and the inside temperature Tin from the temperature sensor 92 and is input from the air-conditioning ECU 59 by communication.

Figure 4:
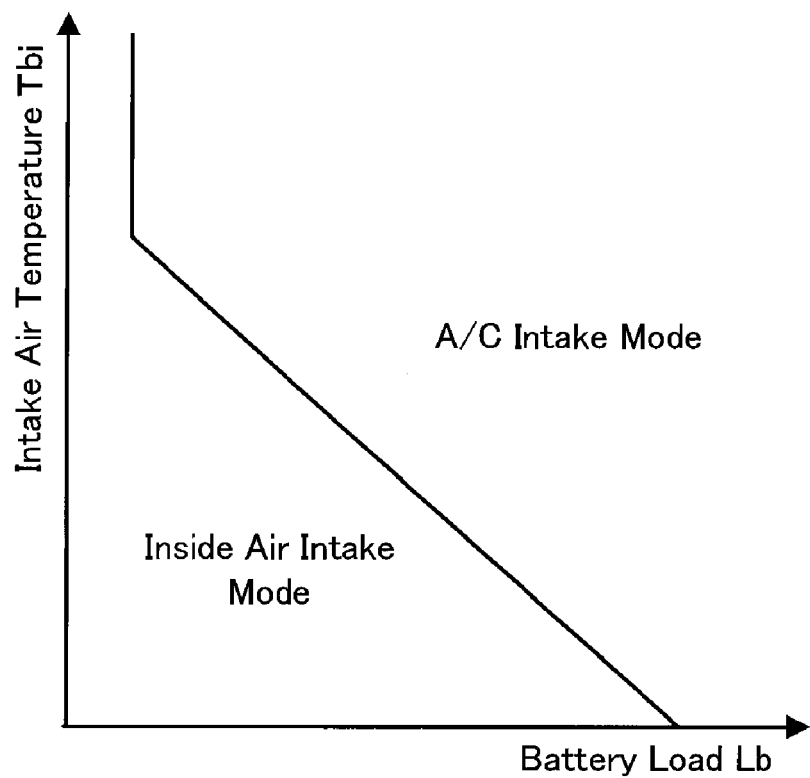
FIG. 4 shows one example of a cooling mode setting map.

After the data input, the CPU 72 identifies a required cooling mode, based on the input intake air temperature Tbi, the input battery load Lb, and a currently set cooling mode Mc (step S110). The required cooling mode is identified according to the intake air temperature Tbi, the battery load Lb, and the currently set cooling mode Mc with referring to a cooling mode setting map. One example of the cooling mode setting map is shown in FIG. 4. The intake air temperature Tbi and the battery load Lb are parameters significantly affecting the temperature of the battery 46 (battery temperature Tb). The higher intake air temperature Tbi and the greater battery load Lb lead to a significant increase in temperature of the battery 46 and thereby require accelerated cooling of the battery 46. The A/C cooling mode is thus required in this case. The lower intake air temperature Tbi and the smaller battery load Lb, on the other hand, lead to a relatively small increase in temperature of the battery 46 and thereby do not require accelerated cooling of the battery 46. The inside air intake mode is thus required in this case. When the required cooling mode Mc is different from the currently set cooling mode Mc, a switchover of the cooling mode Mc is demanded.

Figure 5:
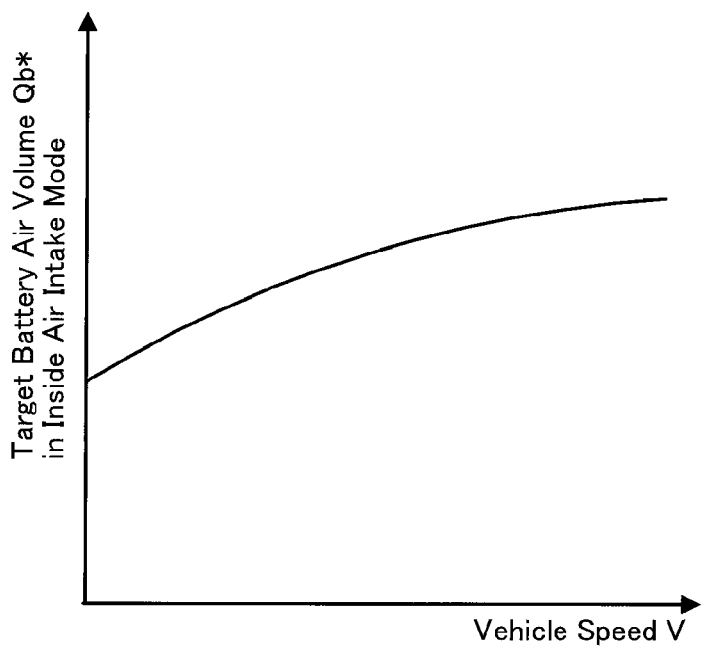
FIG. 5 shows one example of a map representing a variation in target battery air volume Qb* in an inside air intake mode against vehicle speed V.

When the inside air intake mode is required as the cooling mode Mc (step S120), the CPU 72 sets a target battery air volume Qb* to be blown to the battery 46 based on the input vehicle speed V (step S130) and controls the operation of the battery blower fan 64 with the set target battery air volume Qb* (step S180). The battery cooling routine is then terminated. A concrete procedure of setting the target battery air volume Qb* in the inside air intake mode in this embodiment provides and stored in advance a variation in target battery air volume Qb* against the vehicle speed V as a map in the ROM 74 and reads the target battery air volume Qb* corresponding to the given vehicle speed V from the stored map. One example of this map is shown in FIG. 5. The higher vehicle speed V leads to the larger drive-related noise and gives the greater background noise to the driver and the other passengers. The driver or the other passengers are generally not informed of the operation of the battery blower fan 64. The operation of the battery blower fan 64 at a high rotation speed may thus cause the driver and the other passengers to feel odd and uncomfortable. In order to effectively mask the driving noise of the battery blower fan 64 with the background noise increasing with an increase in vehicle speed V, the operation of the battery blower fan 64 is allowed to have the greater target battery air volume Qb* at the higher vehicle speed V. The battery blower fan 64 is thus driven to cool down the battery 46 in a certain range of not making the driver or the other passengers feel odd or uncomfortable.

Figure 6:
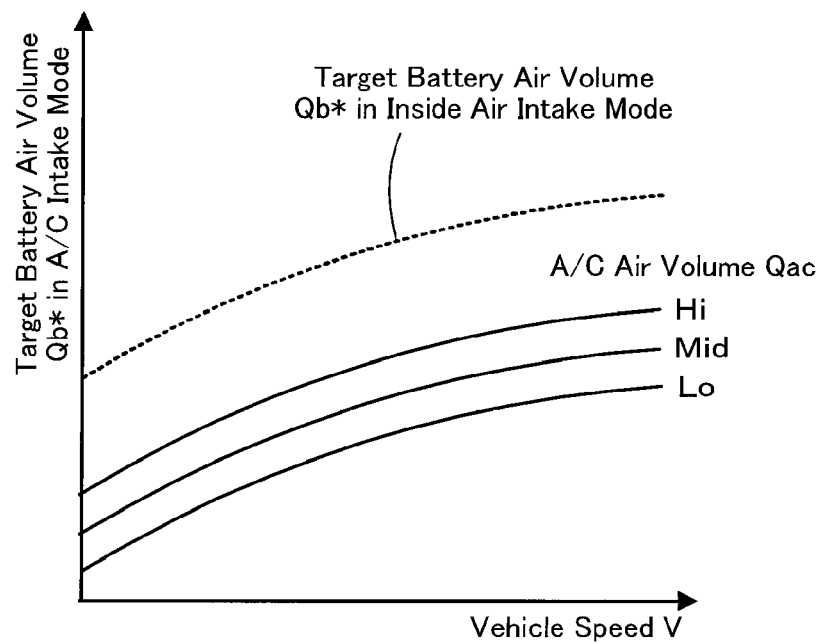
FIG. 6 shows one example of a map representing variations in target battery air volume Qb* in an A/C intake mode against the vehicle speed V with regard to various values of an A/C air volume Qac.

When the A/C intake mode is required as the cooling mode Mc (step S120), on the other hand, the CPU 72 sets the target battery air volume Qb* based on the input vehicle speed V and the input A/C air volume Qac (step S140) and gives an instruction to the air-conditioning ECU 59 to increase the A/C air volume Qac by the set target battery air volume Qb* (step S150). The CPU 72 then controls the operation of the battery blower fan 64 with the set target battery air volume Qb* (step S180) and terminates the battery cooling routine. The air-conditioning ECU 59 receives the instruction of increasing the A/C air volume Qac by the set target battery air volume Qb* and controls the operation of the air-conditioning blower fan 55 with the A/C air volume Qac increased by the target battery air volume Qb*. Intake and blow of the air from the air-conditioning blower fan 55 to the battery 46 with the battery target air volume Qb* do not affect the air conditioning in the passenger compartment 90. A concrete procedure of setting the target battery air volume Qb* in the A/C intake mode in this embodiment provides and stores in advance variations in target battery air volume Qb* against the vehicle speed V with regard to multiple values of the A/C air volume Qac as a map in the ROM 74 and reads the target battery air volume Qb* corresponding to the given vehicle speed V and the given A/C air volume Qac from the stored map. One example of this map is shown in FIG. 6. As shown in this map, the target battery air volume Qb* in the A/C intake mode is smaller than the target battery air volume Qb* in the inside air intake mode at an identical value of the vehicle speed V. As mentioned above, in the A/C intake mode, the air-conditioning blower fan 55 is driven with the A/C air volume Qac increased by the target battery air volume Qb*. The driving noise of the air-conditioning blower fan 55 is thus greater than the driving noise of the battery blower fan 64 in the A/C intake mode. This increases the potential that the driver and the other passengers feel odd and uncomfortable.

Figure 7:
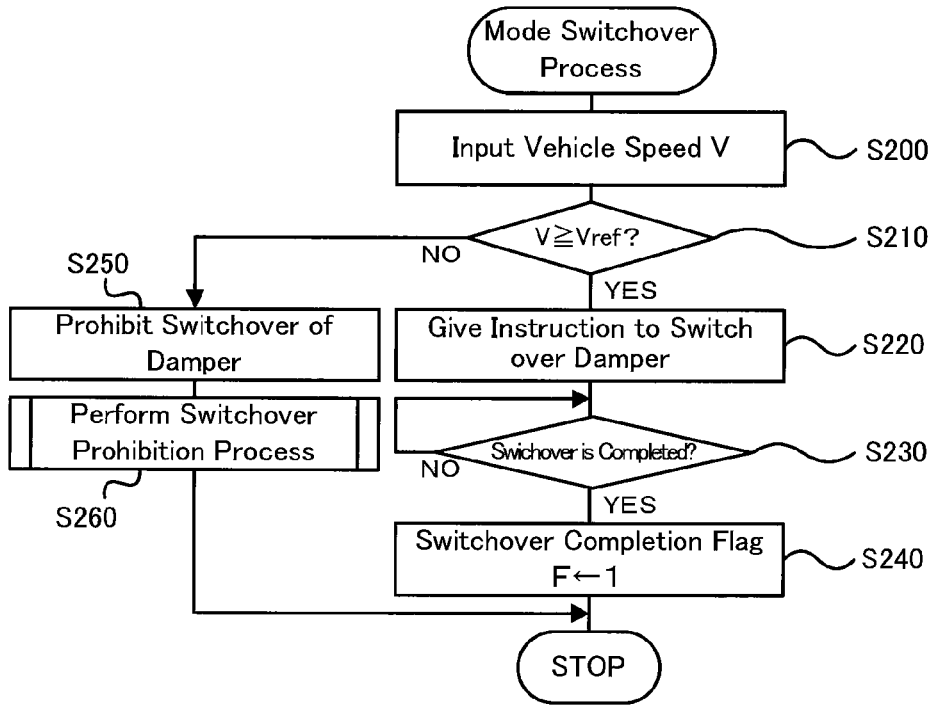
FIG. 7 is a flowchart showing a mode switchover process.

In response to a switchover demand of the cooling mode Mc at step S120, when the current timing is not in the middle of a switchover of the cooling mode Mc (step S160), the CPU 72 starts a mode switchover process (step S170) and controls the operation of the battery blower fan 64 (step S180). The battery cooling routine is then terminated. FIG. 7 is a flowchart showing the mode switchover process executed in parallel with the battery cooling routine by the hybrid electronic control unit 70 in the embodiment. The details of the mode switchover process are described below.

In the mode switchover process, the CPU 72 of the hybrid electronic control unit 70 first inputs the vehicle speed V (step S200) and compares the input vehicle speed V with a preset reference speed Vref (step S210). The reference speed Vref is experimentally determined as a vehicle speed of sufficiently masking the wind noise occurring in the course of a switchover of the mode switchover damper 68 with the drive-related noise. When the input vehicle speed V is not lower than the preset reference speed Vref, the CPU 72 gives an instruction to the air-conditioning ECU 59 to immediately switch over the mode switchover damper 68 (step S220). On completion of the switchover of the mode switchover damper 68 (step S230), the CPU 72 sets a switchover completion flag F to 1 (step S240) and exits from this mode switchover process. The higher vehicle speed V leads to the larger drive-related noise (the larger background noise). Even in the occurrence of wind noise or any other unusual noise in the course of a switchover of the mode switchover damper 68, the background noise effectively masks this wind noise or unusual noise and desirably prevents the driver and the other passengers from feeling odd and uncomfortable. Completion of the switchover of the mode switchover damper 68 may be determined by elapse of a preset time period that is slightly longer than a standard time period generally required for a switchover of the mode switchover damper 68 or may be determined based on a signal from a position sensor of detecting the position of the mode switchover damper 68. The switchover completion flag F set to 1 indicates completion of the switchover of the cooling mode Mc. Until a next switchover demand of the cooling mode Mc at step S120, the battery cooling routine of FIG. 3 goes to the processing of step S130 in the case of the switchover to the inside air intake mode, while going to the processing step S140 in the case of the switchover to the A/C intake mode.

When the input vehicle speed V is lower than the preset reference speed Vref, on the other hand, the CPU 72 prohibits a switchover of the mode switchover damper 68 (that is, a switchover of the cooling mode Mc) (step S250). The CPU 72 then performs a switchover prohibition process shown in FIG. 8 (step S260) and exits from this mode switchover process. When the smaller drive-related noise (background noise) is insufficient for masking the wind noise occurring in the course of a switchover of the mode switchover damper 68, the currently set cooling mode Mc is kept unchanged to prevent the driver and the other passengers from feeling odd and uncomfortable. The mode switchover process of FIG. 7 is performed again upon determination that the current timing is not in the middle of the switchover of the cooling mode Mc at step S160 after identification of a switchover demand of the cooling mode Mc at step S120 in the battery cooling routine of FIG. 3. The details of the switchover prohibition process are described with referring to the flowchart of FIG. 8.

In the switchover prohibition process, the CPU 72 of the hybrid electronic control unit 70 first identifies the currently set cooling mode Mc (step S262). Upon identification of the inside air intake mode as the currently set cooling mode Mc, the CPU 72 increases the target battery air volume Qb* by a preset amount Qb1 (corresponding to the vehicle speed V in the map of FIG. 5) (step S264). Upon identification of the A/C intake mode as the currently set cooling mode Mc, the CPU 72 decreases the target battery air volume Qb* by a preset amount Qb2 (corresponding to the vehicle speed V and the A/C air volume Qac in the map of FIG. 6) (step S266). The CPU 72 subsequently gives an instruction to the air-conditioning ECU 59 to increase the A/C air volume Qac by the decreased target battery air volume Qb* (step S268) and exits from the switchover prohibition process. The amount Q1 is set to drive the battery blower fan 64 in a certain range of preventing the driver and the other passengers from feeling odd and uncomfortable. The amount Q2 is set to drive the battery blower fan 64 at a required minimum level for cooling down the battery 46. Such control compensates for the insufficient cooling of the battery 46 caused by the inside air intake mode kept irrespective of the requirement for cooling the battery 46 in the A/C intake mode. The control also reduces the unnecessary energy consumption of the air conditioner 50 caused by the A/C intake mode kept irrespective of the sufficient cooling of the battery 46 in the inside air intake mode.

In the hybrid vehicle 20 of the embodiment described above, the mode switchover damper 68 switches over the cooling mode Mc by selectively blocking the air conduit 62 in the inside air intake mode of directly blowing the intake air taken in from the passenger compartment 90 to the battery 46 or blocking the branch pipe 66 in the A/C intake mode of blowing the intake air cooled down by the air conditioner 50 to the battery 46. In response to a switchover demand of the cooling mode Mc, when the vehicle speed V is not lower than the preset reference speed Vref, the mode switchover damper 68 is controlled to switch over the cooling mode Mc to satisfy the switchover demand. When the vehicle speed V is lower than the preset reference speed Vref, on the other hand, the switchover of the mode switchover damper 68 is prohibited to keep the currently set cooling mode Mc. Such control effectively enables the wind noise or unusual noise occurring in the course of the switchover of the mode switchover damper 68 to be masked with the drive-related noise. This desirably prevents the driver and the other passengers from feeling odd and uncomfortable by the wind noise or unusual noise occurring in the course of the switchover of the mode switchover damper 68. Under prohibition of the switchover of the mode switchover damper 68, when the currently set cooling mode Mc is the inside air intake mode, the operation of the battery blower fan 64 is controlled by increasing the target battery air volume Qb* by the preset amount Q1. When the currently set cooling mode Mc is the A/C intake mode, the operation of the battery blower fan 64 is controlled by decreasing the target battery air volume Qb* by the preset amount Q2. Such control desirably compensates for the insufficient cooling of the battery 46 or reduces the unnecessary energy consumption of the air conditioner 50.

Figure 9:
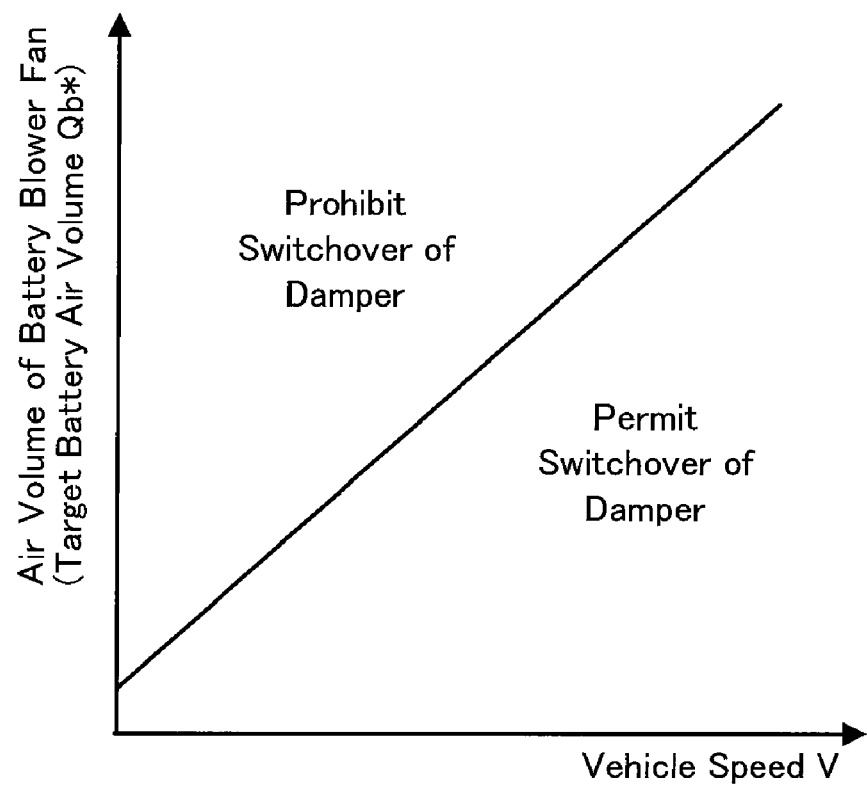
FIG. 9 shows permission and prohibition for a switchover of a mode switchover damper 68 according to the vehicle speed V and the target battery air volume Qb*.

The hybrid vehicle 20 of the embodiment determines permission or prohibition for a switchover of the mode switchover damper 68 based on the vehicle speed V (reflecting the drive-related noise) in the mode switchover process of FIG. 7. One modification may determine permission or prohibition for a switchover of the mode switchover damper 68 by additionally taking into account the air volume of the battery blower fan 64 (the target battery air volume Qb*) in response to a switchover demand of the mode switchover damper 68. The wind noise occurring in the course of the switchover of the mode switchover damper 68 is estimable from the air volume of the battery blower fan 64. This modification thus enables more accurate estimation of whether the drive-related noise sufficiently masks the wind noise occurring in the course of the switchover of the mode switchover damper 68. FIG. 9 shows permission and prohibition for the switchover of the mode switchover damper 68 according to the vehicle speed V and the target battery air volume Qb*.

Figure 10:
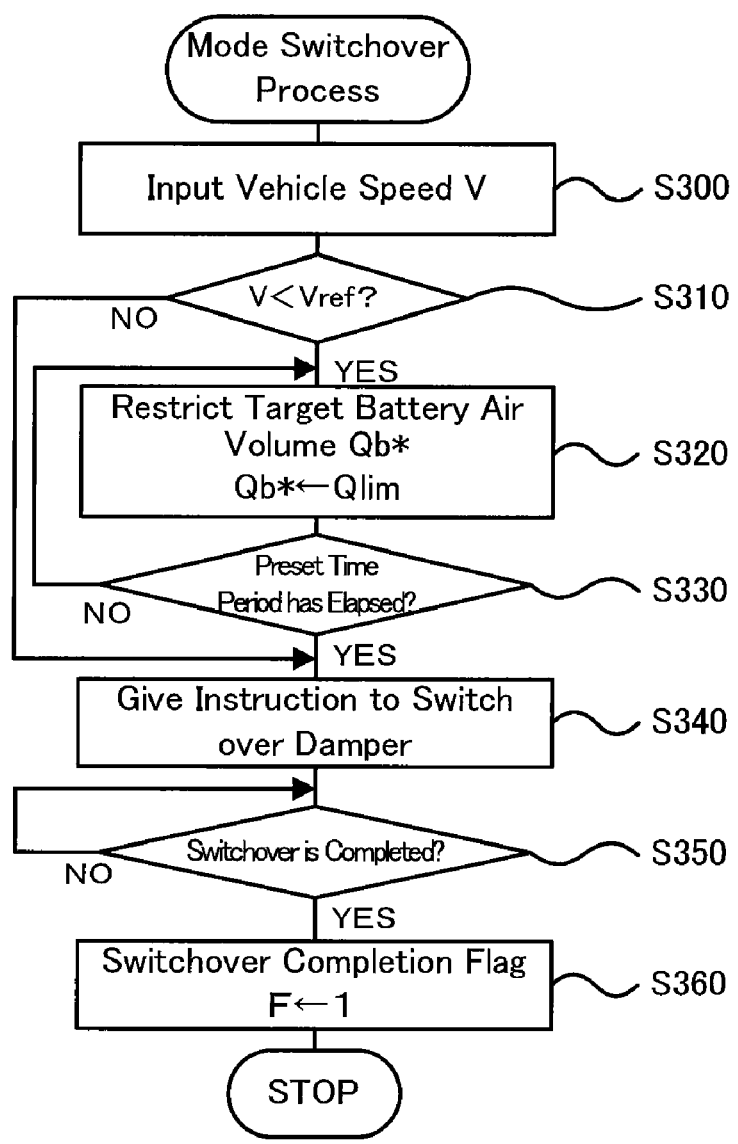
FIG. 10 is a flowchart showing a modified flow of the mode switchover process.

The hybrid vehicle 20 of the embodiment prohibits the switchover of the mode switchover damper 68 at the vehicle speed V of lower than the preset reference speed Vref in the mode switchover process of FIG. 7. One modification may allow the switchover of the mode switchover damper 68 after temporarily restricting the air volume of the battery blower fan 64. A modified flow of the mode switchover process in this modification is shown in FIG. 10. In the modified mode switchover process of FIG. 10, the CPU 72 of the hybrid electronic control unit 70 first inputs the vehicle speed V (step S300) and compares the input vehicle speed V with the preset reference speed Vref (step S310). When the vehicle speed V is not lower than the preset reference speed Vref, the CPU 72 immediately gives an instruction to the air-conditioning ECU 59 to switch over the mode switchover damper 68 (step S340). On completion of the switchover of the mode switchover damper 68 (step S350), the CPU 72 sets the switchover completion flag F to 1 (step S360) and exits from the mode switchover process. When the vehicle speed V is lower than the preset reference speed Vref, on the other hand, the CPU 72 lowers the target battery air volume Qb* of the battery blower fan 64 to a predetermined limit level Qlim (step S320) and waits for elapse of a preset time period required for lowering the actual air flow to the battery 46 to the predetermined limit level Qlim (step S330). The CPU 72 then gives an instruction to the air-conditioning ECU 59 to switch over the mode switchover damper 68. On completion of the switchover of the mode switchover damper 68 (step S350), the CPU 72 sets the switchover completion flag F to 1 (step S360) and exits from the mode switchover process. The limit level Qlim is experimentally determined to control the wind noise occurring in the course of the switchover of the mode switchover damper 68 in a specific range of preventing the driver and the other passengers from feeling odd and uncomfortable. When the small drive-related noise (background noise) fails to sufficiently mask the wind noise occurring in the course of the switchover of the mode switchover damper 68, the target battery air volume Qb* of the battery blower fan 64 is decreased to prevent the occurrence of the wind noise in the course of the switchover of the mode switchover damper 68. This desirably prevents the driver and the other passengers from feeling odd and uncomfortable.

Figure 11:
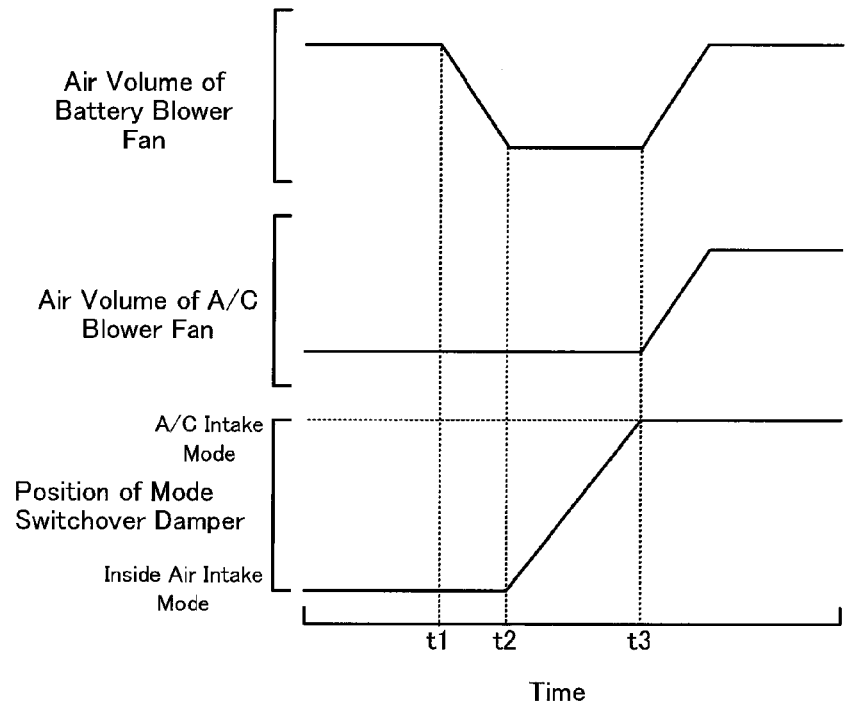
FIG. 11 shows time changes of the air volume of a battery blower fan 64, the air volume of an air-conditioning blower fan 55, and the position of the mode switchover damper 68 in a switchover from the inside air intake mode to the A/C intake mode at the vehicle speed V of lower than a preset reference speed Vref.
Figure 12:
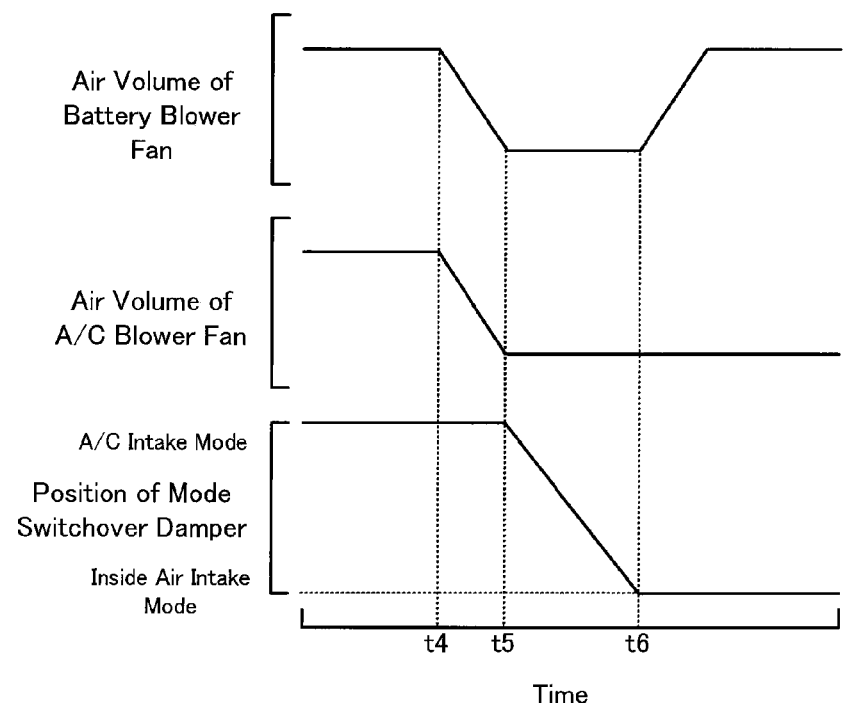
FIG. 12 shows time changes of the air volume of the battery blower fan 64, the air volume of the air-conditioning blower fan 55, and the position of the mode switchover damper 68 in a switchover from the A/C intake mode to the inside air intake mode at the vehicle speed V of lower than the preset reference speed Vref.

FIG. 11 shows time changes of the air volume of the battery blower fan 64, the air volume of the air-conditioning blower fan 55, and the position of the mode switchover damper 68 in the switchover from the inside air intake mode to the A/C intake mode at the vehicle speed V of lower than the preset reference speed Vref. FIG. 12 shows time changes of the air volume of the battery blower fan 64, the air volume of the air-conditioning blower fan 55, and the position of the mode switchover damper 68 in the switchover from the A/C intake mode to the inside air intake mode at the vehicle speed V of lower than the preset reference speed Vref. As shown in FIG. 11, in response to a switchover demand from the inside air intake mode to the A/C intake mode at a time point t1, the target battery air volume Qb* of the battery blower fan 64 is restricted to the predetermined limit level Qlim. The mode switchover damper 68 is then switched over to the A/C intake mode at a time point t2. On completion of the switchover of the mode switchover damper 68 at a time point t3, the restriction of the target battery air volume Qb* is cancelled and the air is blown to the battery 46 in the A/C intake mode. As shown in FIG. 12, in response to a switchover demand from the A/C intake mode to the inside air intake mode at a time point t4, the target battery air volume Qb* of the battery blower fan 64 is restricted to the predetermined limit level Qlim and the increase of the A/C air volume Qac by the target battery air volume Qb* is cancelled. At a time point t5, the position of the mode switchover damper 68 is switched over to the inside air intake mode. On completion of the switchover of the mode switchover damper 68 at a time point t6, the restriction of the target battery air volume Qb* is cancelled and the air is blown to the battery 46 in the inside air intake mode.

Figure 8:
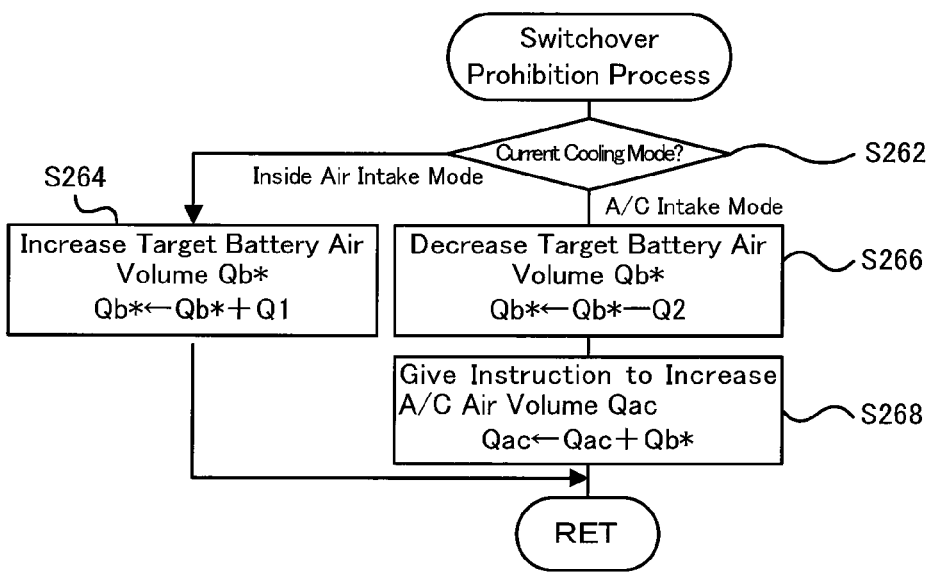
FIG. 8 is a flowchart showing a switchover prohibition process.

Under prohibition of the switchover of the cooling mode Mc, the hybrid vehicle 20 of the embodiment increases the target battery air volume Qb* in the inside air intake mode identified as the currently set cooling mode Mc, while decreasing the target battery air volume Qb* in the A/C intake mode identified as the currently set cooling mode Mc according to the switchover prohibition process of FIG. 8. One modification may not decrease the target battery air volume Qb* in the A/C intake mode identified as the currently set cooling mode Mc, while increasing the target battery air volume Qb* in the inside air intake mode identified as the currently set cooling mode Mc. Another modification may not increase the target battery air volume Qb* in the inside air intake mode identified as the currently set cooling mode Mc, while decreasing the target battery air volume Qb* in the A/C intake mode identified as the currently set cooling mode Mc. Still another modification may neither increase nor decrease the target battery air volume Qb*.

The hybrid vehicle 20 of the embodiment uses the vehicle speed V as a parameter reflecting the noise in the passenger compartment 90 (background noise) or a noise estimation parameter. The vehicle speed V may be replaced by any other suitable parameter reflecting the noise in the passenger compartment 90 (background noise). Available examples of such parameter include a rotation speed Ne of the engine 22 computed from a signal of the crank position sensor 23, a volume level adjusted by the volume control button 89b of the audio equipment 89, and a noise level actually detected by a microphone located in the passenger compartment 90.

The hybrid vehicle 20 of the embodiment identifies the currently set cooling mode Mc, based on the intake air temperature Tbi and the battery load Lb. The currently set cooling mode Mc may be identified based on only the intake air temperature Tbi, based on only the battery load Lb, or based on another suitable parameter, for example, the battery temperature Tb or its increase rate.

The hybrid vehicle 20 of the embodiment has the inside air intake mode of taking in the inside air (the air in the passenger compartment 90) and directly blowing the intake air to the battery 46 and the A/C intake mode of taking in the air cooled down by the air conditioner 50 (evaporator 54) and blowing the intake air to the battery 46, as the available options of the cooling mode Mc in the cooling system 60. The technique of the invention is generally applicable to a cooling system having at least two different cooling modes of taking in the air from different locations and blowing the intake air to the battery, for example, a mode of taking in the outside air and blowing the intake air to the battery and a mode of taking in the air in a vehicle trunk room and blowing the intake air to the battery.

The embodiment regards the cooling system 60 as one application of the invention to cool down the battery 46, which is arranged to transmit electric power to and from the motors MG1 and MG2 in the hybrid vehicle 20 equipped with the engine 22, the planetary gear mechanism 28, and the motors MG1 and MG2. This is, however, not restrictive in any sense. The cooling system of the invention may be applied to cool down a battery or another accumulator arranged to transmit electric power to and from a driving motor in a hybrid vehicle of another configuration or may be applied to cool down a battery or another accumulator arranged to transmit electric power to and from a motor in an electric vehicle equipped with only the motor as the driving power source. The cooling system of the invention may also be applied to cool down an accumulator used for an auto start in a motor vehicle having engine auto stop and auto start functions.

The embodiment and its modified examples discussed above are to be considered in all aspects as illustrative and not restrictive. There may be many other modifications, changes, and alterations without departing from the scope or spirit of the main characteristics of the present invention.

Industrial Applicability

The technique of the present invention is preferably applied to the manufacturing industries of the cooling systems and the motor vehicles.

The invention claimed is:

1. A cooling system constructed to cool down an accumulator mounted on a motor vehicle, the cooling system comprising:
   an air blower configured to have multiple air blow modes of taking in the air from different locations and blowing the intake air to the accumulator;
   a damper configured to change over connection and disconnection of multiple air flow paths in the multiple air blow modes and thereby switch over a current air blow mode between the multiple air blow modes;
   a vehicle speed detector configured to detect a vehicle speed of the motor vehicle; and
   a controller configured to, in response to a switchover demand of the current air blow mode in a state of blowing the intake air to the accumulator via the damper, control the air blower and the damper to switch over the current air blow mode based on the detected vehicle speed of the motor vehicle, wherein when the detected vehicle speed of the motor vehicle is not lower than a preset reference level, the controller controls the air blower and the damper to switch over the current air blow mode in order to satisfy the switchover demand, and
   when the detected vehicle speed of the motor vehicle is lower than the preset reference level, the controller controls the air blower and the damper to keep the current air blow mode unchanged, irrespective of the switchover demand.

2. The cooling system in accordance with claim 1, the cooling system further having:
   an air conditioner configured to condition the air in the passenger compartment,
   wherein the multiple air blow modes include a first air blow mode of taking in the air inside the passenger compartment or outside the passenger compartment and directly blowing the intake air to the accumulator and a second air blow mode of taking in the air cooled down by the air conditioner and blowing the cooled intake air to the accumulator.

3. The cooling system in accordance with claim 2, wherein in response to a switchover demand requiring a switchover from the first air blow mode to the second air blow mode, when the detected vehicle speed of the motor vehicle is not lower than a preset reference level, the controller controls the air blower and the damper to switch over the first air blow mode to the second air blow mode, and
   when the detected vehicle speed of the motor vehicle is lower than the preset reference level, the controller controls the air blower and the damper to keep the first air blow mode unchanged and increase an air volume blown to the accumulator.

4. The cooling system in accordance with claim 2, wherein in response to a switchover demand requiring a switchover from the second air blow mode to the first air blow mode, when the detected vehicle speed of the motor vehicle is not lower than a preset reference level, the controller controls the air blower and the damper to switch over the second air blow mode to the first air blow mode, and
   when the detected vehicle speed of the motor vehicle is lower than the preset reference level, the controller controls the air blower and the damper to keep the second air blow mode unchanged and decrease an air volume blown to the accumulator.

5. The cooling system in accordance with claim 2, wherein the second air blow mode activates the air conditioner with a total air volume as a sum of an air volume required to condition the air in the passenger compartment and an air volume required to be blown to the accumulator, takes in the air cooled down by the air conditioner at the air volume required to be blown to the accumulator, and blows the cooled intake air to the accumulator.

6. The cooling system in accordance with claim 1, wherein in response to the switchover demand, the controller controls the air blower and the damper to switch over the current air blow mode by additionally taking into account an air volume blown to the accumulator.

7. The cooling system in accordance with claim 1, further comprising a noise level detection-estimation module that detects or estimates the noise level in the passenger compartment, based on the detected vehicle speed.

8. The cooling system in accordance with claim 7, the cooling system being mounted on a motor vehicle equipped with an internal combustion engine,
   wherein the noise level detection-estimation module has an engine rotation speed detector configured to detect a rotation speed of the internal combustion engine, and the noise level detection-estimation module detects or estimates the noise level in the passenger compartment, based on the detected rotation speed of the internal combustion engine.

9. The cooling system in accordance with claim 7, the cooling system being mounted on a motor vehicle equipped with an audio output module configured to output sound with an adjustable volume in the passenger compartment,
wherein the noise level detection-estimation module detects or estimates the noise level in the passenger compartment, based on a volume adjustment condition of the audio output module.

10. The cooling system in accordance with claim 1, the cooling system further having:
a temperature-relevant parameter detector configured to detect a temperature-relevant parameter reflecting a temperature of the accumulator,
wherein the switchover demand of the current air blow mode is given, based on the detected temperature-relevant parameter.

11. The cooling system in accordance with claim 1, wherein the accumulator is designed to transmit electric power to and from a driving motor mounted on the motor vehicle.

12. A motor vehicle equipped with the cooling system in accordance with claim 1.

13. A control method of a cooling system, the cooling system having:
an air conditioner configured to condition the air in a passenger compartment of a motor vehicle; an air blower configured to have multiple air blow modes of taking in the air from different locations and blowing the intake air to an accumulator mounted on the motor vehicle; and a damper configured to change over connection and disconnection of multiple air flow paths in the multiple air blow modes and thereby switch over a current air blow mode between the multiple air blow modes,
in response to a switchover demand of the current air blow mode in a state of blowing the intake air to the accumulator via-the damper, the control method controlling the damper to switch over the current air blow mode based on a detected vehicle speed of the motor vehicle, wherein when the detected vehicle speed of the motor vehicle is not lower than a preset reference level, the air blower and the damper are controlled to switch over the current air blow mode in order to satisfy the switchover demand, and
when the detected vehicle speed of the motor vehicle is lower than the preset reference level, the air blower and the damper are controlled to keep the current air blow mode unchanged, irrespective of the switchover demand.

* * * * *